Dec. 28, 1965 G. R. DRENGLER 3,226,260
RECHARGEABLE ALKALINE CELL
Filed March 1, 1963 2 Sheets-Sheet 1

INVENTOR.
GEORGE R. DRENGLER
BY
ATTORNEY

Dec. 28, 1965  G. R. DRENGLER  3,226,260
RECHARGEABLE ALKALINE CELL
Filed March 1, 1963  2 Sheets-Sheet 2

INVENTOR.
GEORGE R. DRENGLER
BY
ATTORNEY

United States Patent Office 3,226,260
Patented Dec. 28, 1965

3,226,260
RECHARGEABLE ALKALINE CELL
George R. Drengler, North Olmsted, Ohio, assignor to Union Carbide Corporation, a corporation of New York
Filed Mar. 1, 1963, Ser. No. 262,149
17 Claims. (Cl. 136—30)

This application is a continuation-in-part application of my applications Serial No. 43,389 and Serial No. 43,563, both filed on July 18, 1960, now abandoned.

The invention relates to a rechargeable alkaline cell which employs a zinc negative electrode, and particularly refers to a novel cell construction which can increase the cycle life of the cell.

The cycle life of typical secondary alkaline cells of the flat plate, closely spaced electrode type using zinc negative electrodes is limited by sporadic zinc deposition around or through the diaphragm or separator members which often leads to short circuiting of the battery plates, a condition known as "treeing" because of the appearance of the plates so affected.

Conventional cells of this type contain a zinc electrode which is separated from a reversible positive member (silver oxide, mercuric oxide, nickel oxide, manganese dioxide, etc.) by a diaphragm. The pore diameters of the diaphragm are preferably small enough to prevent zinc trees from growing through, but sometimes the diaphragm contains a pin hole or weak spot which allows a zinc tree to form through the diaphragm during charging. The electrodes are usually suspended in an excess of electrolyte, and when the unit is overcharged, the deposition of zinc around the outside of the diaphragm can also be observed. The zinc so formed, being out of the direct current path, is less available for electrochemical oxidation on subsequent discharge, and is also a source of short circuits. In as few as three or four cycles, the zinc trees or deposits can grow to a point at which the cell is rendered useless by the short circuits. In this regard, the high treeing tendency of zinc negative electrodes is to be contrasted with the low treeing tendency of cadmium negative electrodes in cells, such as the nickel-cadmium system, which have long cycle life.

The main object of the invention, therefore, is to provide a rechargeable alkaline cell employing a zinc negative electrode, but having the capability of long cycle life.

Another object of the invention is to make possible the use of flat zinc electrodes in sealed cell constructions of the secondary alkaline system.

Another object is to minimize the condition known as treeing in rechargeable cells employing zinc negative electrodes.

The invention achieves the above objects by the provision, in a rechargeable cell having a zinc negative electrode, of a separator which permits the oxygen evolved at the positive electrode during charging to contact the zinc trees which may form on the negative electrode, thereby oxidizing the trees and dissolving them into the electrolyte as a form of zinc oxide which may be replated on the negative electrode. The separator preferably comprises a body of separator material having a side which fits against the negative electrode and conduit means positioned away from this side for permitting evolved oxygen to enter into the volume between the electrodes.

Another aspect of the invention includes the substantial elimination of free electrolyte from the cell container, which minimizes the formation of zinc deposits on the outer edges of the negative electrode, and which in combination with the separator of the invention provides a rechargeable cell capable of employing zinc negative electrodes while maintaining long cycle life.

Figure 1:
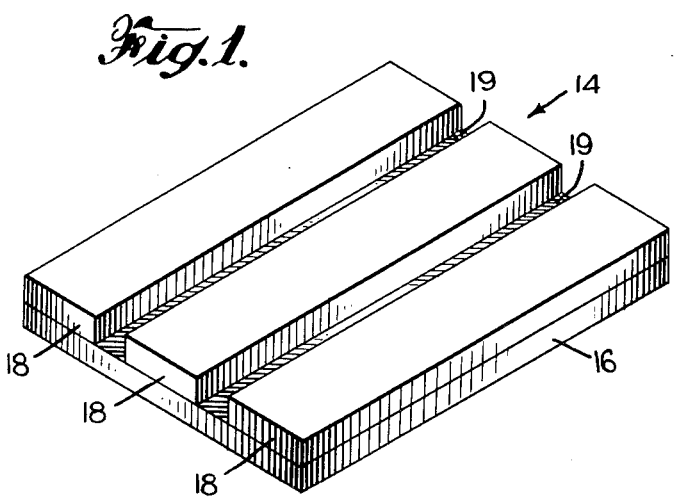
FIG. 1 is a perspective view of a separator in accord with the invention.

Referring now the drawing, FIG. 1 shows a separator 14 made in accordance with the invention. The separator 14 comprises a gas and electrolyte permeable mat or sheet 16 with spaced strips 18 secured to one side thereof by heat bonding, suitable adhesives, or other means to form channels 19 therebetween. The separator 14 can be made as an integral molded unit, but heat bonding the strips 18 on the mat 16 has been found to be convenient. Although the above separator construction is preferred in the practice of the invention, other constructions which comprise a flat sheet of separator material and conduit means positioned away from the surface intended for use against the negative electrode will be apparent to persons in the art. For example, another suitable construction comprises a pair of mats, one of which is secured to the other at a number of places while leaving conduits between the mats. Another suitable construction comprises a mat having secured thereto, on one side thereof, a number of spaced square pieces or other shapes which provide channels therebetween.

The separator 14 can be made of any suitable separator material, such as a vinyl chloride-vinyl acetate copolymer containing from about 80 to about 96 percent by weight vinyl chloride, nylon, a copolymer of acrylonitrile and vinyl chloride such as "Dynel," and the like.

Figure 2:
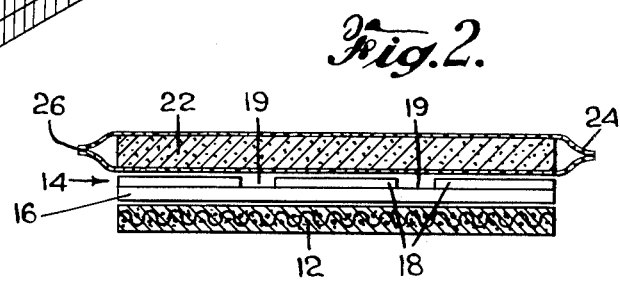
FIG. 2 is a cross-sectional elevation view of a cell in accordance with the invention.

A cell made in accordance with the invention is shown in FIG. 2 and this cell comprises a zinc negative electrode 12, a reversible positive electrode 22, and the separator 14 of the invention disposed between the two with the mat 16 facing the negative 12 and the spaced strips 18 and channels 19 facing the positive 22. The zinc negative electrode 12 can be made by spreading zinc oxide and potassium hydroxide on a screen and then charging this mass to form zinc on the screen, but other methods are known in the art. The positive 22 can be made by sintering particulate nickel into a porous nickel plaque, impregnating the plaque with a suitable nickel salt such as nickel nitrate, and then charging the plaque in potassium hydroxide electrolyte to form an electrode containing a form of nickel oxide and/or hydroxide.

The positive electrode 22 is preferably disposed in a sheath of a positive electrode diaphragm 24 made of an electrolyte permeable, microporous diaphragm material, such as cellophane, other types of regenerated cellulose, or a microporous film of plastic material such as polyvinylidene chloride (Saran), which helps to minimize the opportunity of a zinc tree growing from the negative 12 to the positive 22. The diaphragm 24 contains at least one slit or opening at the edge or end of the positive 22 through which the gas evolved at the positive can escape and then enter the channels 19 in the separator 14. The diaphragm 24 needs not be wrapped completely around the positive 22, however, since a single layer of this diaphragm material adjacent the positive electrode surface facing the negative electrode will suffice.

The negative electrode 12, separator 14, positive electrode 22, and diaphragm 24 all contain absorbed alkaline electrolyte, preferably an aqueous solution of potassium or sodium hydroxide, in an amount sufficient for cell operation but not in an amount so excessive that it will not be retained in and between these parts by capillary action or other forces. The restriction of the cell electrolyte to the cell components and the spaces between helps to eliminate zinc deposition around the edges of the negative electrode. For cell assembly, the electrolyte may be added to the cell components by soaking them in a bath of electrolyte prior to assembly and then removing excess electrolyte by blotting the exterior faces of the components.

The cell of the present invention preferably employs a zinc negative electrode modified by adding to the negative electrode a zinc compound reducible in alkaline solution, such as zinc oxide or calcium zincate, to act as a charge reserve. This compound is preferably no more than slightly soluble in the cell electrolyte, which may include dissolved charge reserve or other material to minimize the solubility of the zinc compound. Furthermore, this zinc compound is preferably coated over the zinc negative to form an overlay thereon in an amount between about 0.080 and about 0.085 gram per gram of active zinc in the zinc negative, since an overlay inhibits the formation of zinc trees and thus cooperates with the novel cell construction disclosed herein to minimize zinc tree formation. The zinc compound may be applied by spraying or spreading a mixture of water and the zinc compound on the negative electrode surface and then drying to form the overlay. Similarly, a paste of the zinc compound and an aqueous solution of potassium hydroxide or other electrolyte material may be spread on the negative to provide the reserve, there being no necessity of drying in this case if the concentration of the solution of potassium hydroxide is approximately equal to the concentration of the cell electrolyte.

Figure 3:
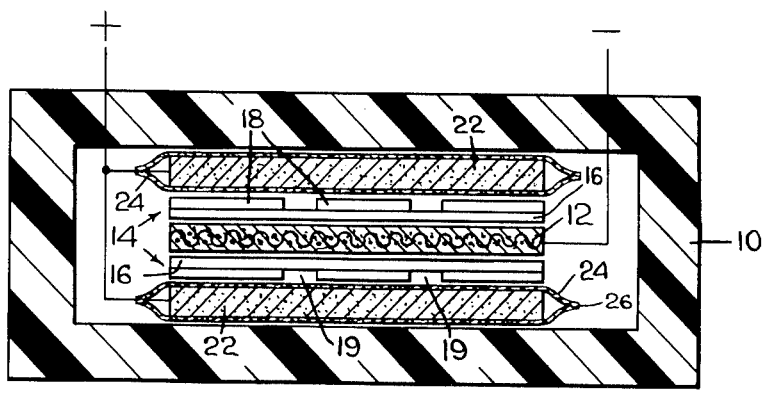
FIG. 3 is a cross-sectional view of a cell in accord with the invention shown in its container.

FIG. 3 shows a cell made in accordance with the above-described procedures. The cell is exactly like the one described in FIG. 2 except it contains a pair of positive electrodes 22 and is shown disposed in a sealed cell container 10. Cells like this one have been continuously overcharged for periods up to 36 hours while maintaining a reasonable equilibrium gas pressure within the cell container. Comparative performance of sealed nickel-zinc secondary cells with and without the separator of the invention is shown by the graphs in FIGS. 4 and 5.

Figure 4:
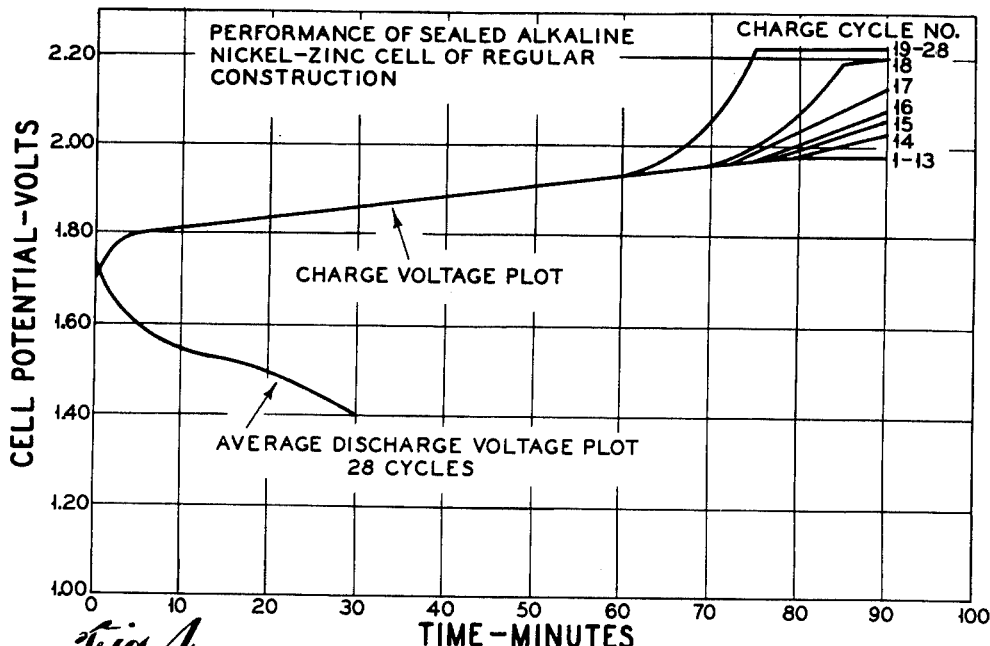
FIGS. 4 and 5 are graphs illustrating the performance of a cell in accord with the invention.

In FIG. 4, the cell was constructed in the conventional manner with the diaphragm member against the zinc negative electrode. This cell operated normally until after the thirteenth cycle when hydrogen evolution began as a result of the depletion of the zinc oxide charge reserve. The internal pressure continually increased with successive cycles indicating little if any oxygen combination with the zinc.

Figure 5:
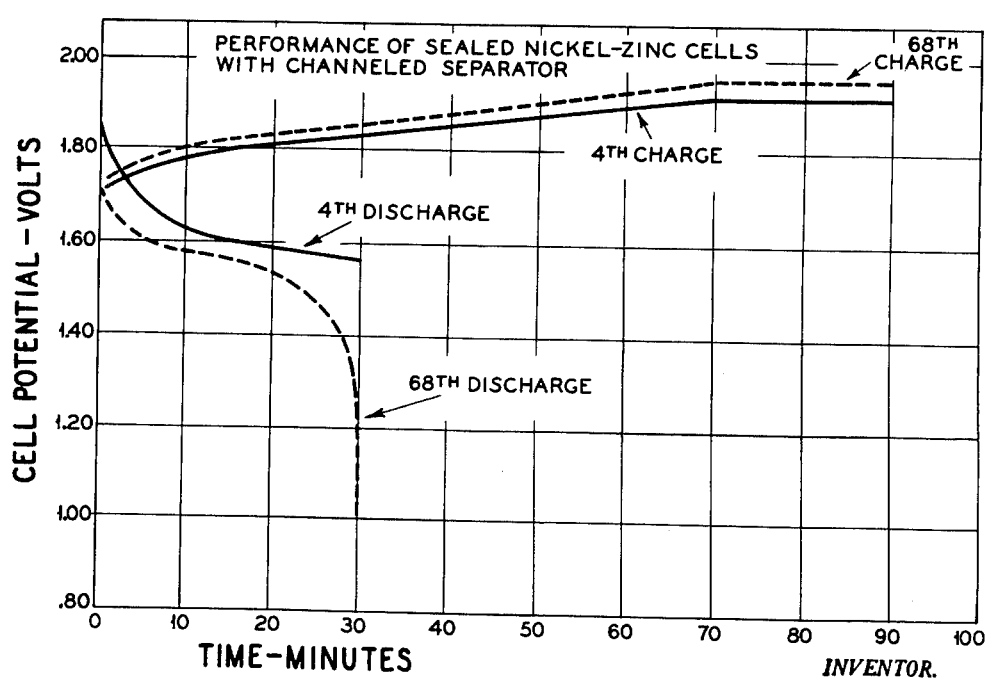

FIG. 5 is a graph illustrating the performance of sealed nickel-zinc cells made in accordance with the invention. It should be noticed that the sixty-eighth cycle of charge and discharge closely approximates the fourth cycle. Furthermore, continuous overcharge for 36 hours did not damage the cells, and did not result in deleterious treeing. The equilibrium gas pressure established in the cells was about 90 to 95 pounds per square inch gauge.

It is believed that the elimination of treeing results from two different effects of the separator of the invention. First, a zinc tree must grow through the sheet of separator material disposed against the negative electrode to reach the positive electrode, and in doing so will necessarily exist in the form of a whisker. Second, the separator of the invention directs oxygen to the side of the separator where the zinc tree can exist only in the form of a whisker, thereby permitting the oxygen to oxidize the zinc tree more readily than if it were larger. Thus, the cycle life of a cell is prolonged by the continual oxidation of any zinc trees which may grow close to the positive electrode. Furthermore, the oxidation of the trees and the resultant dissolution of zinc oxide into the electrolyte maintain a proper concentration of zinc oxide in the electrolyte and minimize hydrogen evolution at the negative electrode during charging.

It will be apparent to those in the art that cells of the invention should be constructed so as to maintain a reserve of discharged negative material during charging to avoid hydrogen evolution at the negative electrode. Thus, the capacity of the positive material which is usable on discharge should be less than the capacity of the negative material both charged and discharged, and some discharged negative material should remain after charging.

What is claimed is:

1. A rechargeable cell comprising a sealed cell container and in said container an alkaline electrolyte, a porous zinc negative electrode, a porous separator having one of its sides against said negative electrode, said separator having conduit means therein positioned away from the side against said negative electrode for permitting the entry of gas, and positioned against said separator on its side opposite said negative electrode a reversible, porous positive electrode; said alkaline electrolyte being substantially held in the pores of said separator and positive and negative electrodes.

2. The rechargeable cell defined in claim 1 wherein said zinc negative electrode comprises an overlay of a zinc compound reducible in alkaline electrolyte.

3. The rechargeable cell defined in claim 1 wherein said separator comprises a mat of vinyl chloride-vinyl acetate copolymer having secured thereto on one surface thereof a plurality of spaced strips of the same material, said strips defining channels therebetween.

4. A rechargeable cell comprising a sealed cell container and in said container an alkaline electrolyte, a porous zinc negative electrode, a porous separator having one of its sides against said negative electrode, said separator having conduit means therein positioned away from the side against said negative electrode for permitting the entry of gas, a porous positive electrode diaphragm disposed against said separator on its side opposite said negative electrode, and a porous reversible positive electrode disposed against said diaphragm; said alkaline electrolyte being substantially held in the pores of said separator and positive and negative electrodes.

5. The rechargeable cell defined in claim 4 wherein said zinc negative electrode comprises an overlay of a zinc compound reducible in alkaline electrolyte.

6. The rechargeable cell defined in claim 4 wherein said separator comprises a mat of vinyl chloride-vinyl acetate copolymer having secured thereto on one surface thereof a plurality of spaced strips of the same material, said strips defining channels therebetween.

7. The rechargeable cell defined in claim 4 wherein said diaphragm consists of regenerated cellulose.

8. A rechargeable cell comprising a sealed cell container and in said container an alkaline electrolyte, a porous zinc negative electrode, a porous separator against said negative electrode, said separator comprising a sheet of separator material and a plurality of spaced strips forming channels therebetween on its side opposite said negative electrode, a porous positive electrode diaphragm disposed against said separator on its side opposite said negative electrode, and a porous reversible positive electrode disposed against said diaphragm; said alkaline electrolyte being substantially held in the pores of said separator, diaphragm, and positive and negative electrodes.

9. The rechargeable cell defined in claim 8 wherein said zinc negative electrode comprises an overlay of a zinc compound reducible in alkaline electrolyte.

10. The rechargeable cell defined in claim 8 wherein said separator comprises a mat of vinyl chloride-vinyl acetate copolymer having secured thereto on one surface thereof a plurality of spaced strips of the same material, said strips defining channels therebetween.

11. The rechargeable cell defined in claim 8 wherein said diaphragm consists of regenerated cellulose.

12. A rechargeable cell comprising a sealed cell container and in said container an alkaline electrolyte, a porous flat zinc negative electrode, a porous separator against said negative electrode, said separator having on the side opposite said negative electrode a plurality of spaced strips forming channels therebetween, and positioned against said separator on the side having said channels a porous reversible positive electrode disposed in a sheath of a porous thin positive electrode diaphragm having an end slit for the escape of gases from said positive electrode; said alkaline electrolyte being substantially held in the pores of said separator, diaphragm, and positive and negative electrodes.

13. The rechargeable cell defined in claim 12 wherein said zinc negative electrode comprises an overlay of a zinc compound reducible in alkaline electrolyte.

14. The rechargeable cell defined in claim 12 wherein said separator comprises a mat of vinyl chloride-vinyl acetate copolymer having secured thereto on one surface thereof a plurality of spaced strips of the same material, said strips defining channels therebetween.

15. The rechargeable cell defined in claim 12 wherein said diaphragm consists of regenerated cellulose.

16. A rechargeable cell comprising a sealed cell container and in said container an alkaline electrolyte, a porous flat zinc negative electrode, a porous separator made of a vinyl chloride-vinyl acetate copolymer containing from about 80 to about 96 percent by weight vinyl chloride disposed against said negative electrode, said separator having on its side opposite said negative electrode a plurality of spaced strips forming channels therebetween, and positioned against said separator on its side opposite said negative electrode a porous reversible positive electrode wrapped in a porous positive electrode diaphragm made of cellophane and having an end slit for the escape of gases from said positive electrode; said alkaline electrolyte being substantially held in the pores of said separator, diaphragm, and positive and negative electrodes.

17. The rechargeable cell defined in claim 16 wherein said positive electrode comprises as an active material at least one member selected from the group consisting of silver oxide, mercuric oxide, nickel oxide, and manganese dioxide.

References Cited by the Examiner

UNITED STATES PATENTS

| | | | |
|---|---|---|---|
| 1,492,816 | 5/1924 | Stone | 136—143 |
| 2,554,504 | 5/1951 | Ruben | 136—7 |
| 2,610,219 | 9/1952 | Yardney | 136—6 |
| 2,842,607 | 7/1958 | Germershausen et al. | 136—6 |
| 2,925,456 | 2/1960 | Beusker et al. | 136—145 |
| 2,994,729 | 8/1961 | Solomon et al. | 136—24 |

FOREIGN PATENTS

| | | |
|---|---|---|
| 295,584 | 8/1928 | Great Britain. |

WINSTON A. DOUGLAS, *Primary Examiner.*

MURRAY TILLMAN, JOHN H. MACK, *Examiners.*